C. BORNMANN.
FILM PACK CAMERA.
APPLICATION FILED APR. 28, 1915.
1,154,285.
Patented Sept. 21, 1915.
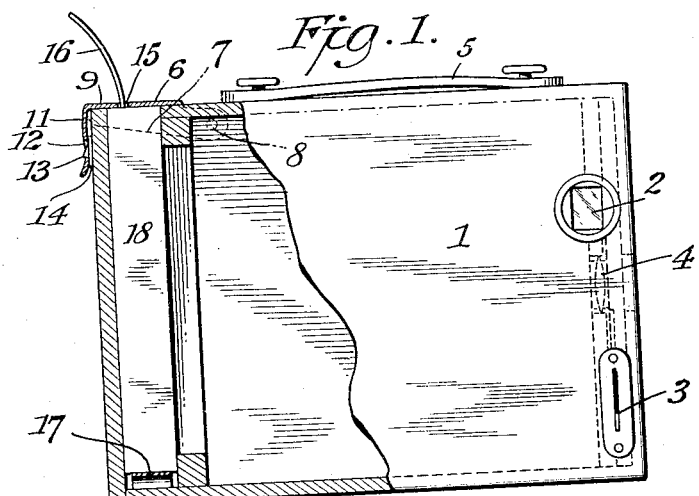
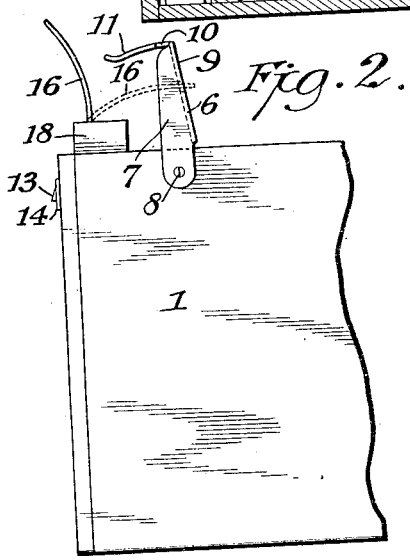
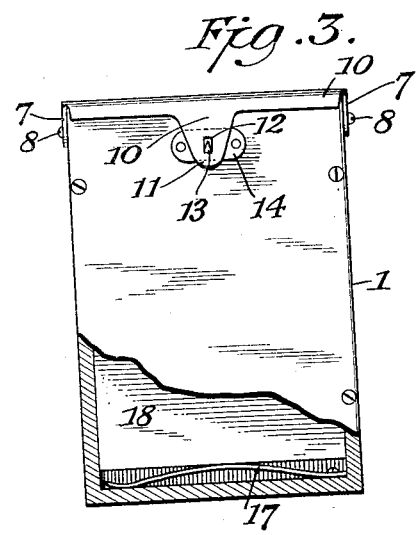
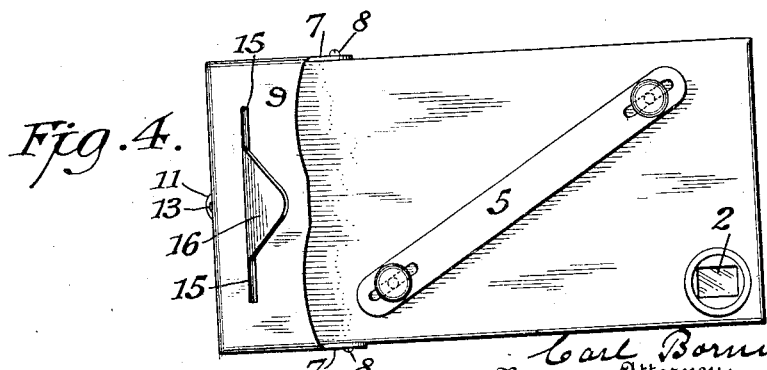
Inventor.
Carl Bornmann.
By his Attorney.
Phillips Abbott.

UNITED STATES PATENT OFFICE.

CARL BORNMANN, OF BINGHAMTON, NEW YORK, ASSIGNOR TO ANSCO COMPANY, A CORPORATION OF NEW YORK.

FILM-PACK CAMERA.

1,154,285.  Specification of Letters Patent.  Patented Sept. 21, 1915.

Application filed April 28, 1915. Serial No. 24,406.

*To all whom it may concern:*

Be it known that I, CARL BORNMANN, a citizen of the United States, and a resident of the city of Binghamton, county of Broome, and State of New York, have invented certain new and useful Improvements in Film-Pack Cameras, of which the following is a specification.

It is the purpose of this invention to provide a simply constructed and efficient film pack camera, so made that the film pack shall be securely held in place, that its introduction to and removal from the camera may be easily effected and that the opening through which the leading strip, tab or tabs, so called, project, shall be so constructed as to practically preclude the entrance of light, thus preventing fogging of the film.

In the drawings Figure 1 is a side elevation of a camera embodying the invention partly broken away and shown in section, the parts being in the position they occupy when ready for use; Fig. 2 is a side elevation of the rear part of a camera embodying the invention, the parts being in position for the insertion or removal of the pack; Fig. 3 is a rear elevation of the camera partly broken away to show the spring, which projects the pack for ready removal and holds it firmly in position; Fig. 4 is a plan view of the camera, the parts being in position for use.

In the drawings, 1 represents the camera body, 2, 2, (see Figs. 1 and 4) the finders, one for horizontal and the other for vertical exposures, 3 the shutter manipulating devices, 4 the lens, 5 the handle.

The camera is made in the form of a closed box having a film pack chamber in rear of the focal plane and an opening through the upper wall of the box through which the pack may be introduced into the chamber. This opening has a swinging cover 6, which has flanges 7, 7, at its ends which embrace the adjoining edges of the camera box and are provided at their ends respectively with suitable pivots 8, 8, whereby the swinging cover is pivoted to the camera box. The cover is flat on its top 9 and is provided with an overhanging flange 10 on its rear edge provided with a lip 11 having an opening 12 therein which, when the cover is fully closed, catches over a projection 13 made upon a plate 14 fastened to the camera box.

In the flat top of the swinging cover there is made a narrow opening or slot 15 of such restricted width as will permit the leading strip or all of the tabs 16 of the film pack, as the case may be, to project therefrom and pass therethrough with as little open space as may be, thus precluding the entrance of light and it will be noted that as the successive exposures are made and the leading strip or tabs are torn off, their ragged edges accumulating at the opening 15 will additionally preclude the entrance of light and this result is further assured by the action of a spring 17 (see Figs. 1 and 3) which is located in the bottom of the film chamber and upon which the film pack 18 rests and is compressed by it when the swinging cover 6 is closed and latched. When the cover is opened, as in Fig. 2, this spring projects the upper edge of the pack 18 as shown above the side of the camera so that it may be easily grasped and removed. It will be noted that the spring presses the ragged edges of the torn off leading strip or tabs and also the upper edge of the pack itself snugly against the closed cover, thus, as stated, aiding in the exclusion of light.

The operation, in view of what has been said, is obvious and does not require specific description except to say that upon the introduction of the pack, as shown in Fig. 2, and before the closing of the swinging cover upon it, the projecting end of the leading strip or of the tabs 16, as the case may be, should be bent over and introduced through the narrow slot or opening 15 in the swinging cover, as indicated in dotted lines in Fig. 2.

It will be obvious to those who are familiar with this art that modifications may be made in the details of construction and yet the essentials of the invention be retained. I therefore do not limit myself to the details.

I claim:

1. A camera having a film pack chamber at the focal plane, an opening for the introduction of the pack at the upper end of the chamber, a spring at its lower end, a cover for the opening provided with a narrow slot and means to lock the cover when closed.

2. A camera having a film pack chamber at the focal plane, an opening for the introduction of the pack in the upper end of the chamber, a spring at its lower end, a swinging cover for the opening pivoted to the camera body and provided with a narrow slot and means to lock the cover when it is closed.

3. A camera having a film pack chamber at the focal plane, an opening for the introduction of the pack at the upper end of the chamber, a spring at its lower end, a cover for the opening having a flat top and flanges upon three of its sides and a narrow slot in the flat top and means to lock the cover when it is closed.

4. A camera having a film pack chamber at the focal plane, an opening for the introduction of the pack into the chamber, a spring in the chamber opposite the said opening, a cover for the opening provided with a narrow slot and means to lock the cover and hold it closed against the stress of the spring when the pack is in position.

5. A camera having a film pack chamber at the focal plane, an opening for the introduction of the pack into the chamber, a spring within the chamber opposite said opening adapted to be put under stress by the insertion of the pack, a cover for the opening provided with a narrow slot and means to lock and hold the cover shut against the stress of the spring when the pack is in position.

In testimony whereof I have signed my name to this specification.

CARL BORNMANN.

Copies of this patent may be obtained for five cents each, by addressing the "Commissioner of Patents, Washington, D. C."